US012624784B2

(12) United States Patent
Jang et al.

(10) Patent No.: US 12,624,784 B2
(45) Date of Patent: May 12, 2026

(54) FLUID COUPLINGS WITH AN IN-LINE FLOW VALVE

(71) Applicant: Colder Products Company, Roseville, MN (US)

(72) Inventors: Samuel M. Jang, Woodbury, MN (US); Jack T. Stangl, Falcon Heights, MN (US); Loi T. Truong, Savage, MN (US)

(73) Assignee: Colder Products Company, Roseville, MN (US)

( * ) Notice: Subject to any disclaimer, the term of this patent is extended or adjusted under 35 U.S.C. 154(b) by 0 days.

(21) Appl. No.: 18/884,812

(22) Filed: Sep. 13, 2024

(65) Prior Publication Data

US 2025/0092974 A1 Mar. 20, 2025

Related U.S. Application Data

(60) Provisional application No. 63/538,726, filed on Sep. 15, 2023.

(51) Int. Cl.
| | |
|---|---|
| *F16L 29/00* | (2006.01) |
| *F16K 31/44* | (2006.01) |
| *F16K 35/02* | (2006.01) |
| *F16L 37/44* | (2006.01) |
| *F16K 1/36* | (2006.01) |

(52) U.S. Cl.
CPC .......... *F16L 29/007* (2013.01); *F16K 31/445* (2013.01); *F16K 35/025* (2013.01); *F16L 37/44* (2013.01); *F16K 1/36* (2013.01); *F16L 2201/44* (2013.01)

(58) Field of Classification Search
CPC ..... F16L 29/007; F16L 37/44; F16L 2201/44; F16K 1/36; F16K 1/50; F16K 35/025; F16K 31/445; F16K 31/508
See application file for complete search history.

(56) References Cited

U.S. PATENT DOCUMENTS

| | | | |
|---|---|---|---|
| 2012/0192968 A1 | 8/2012 | Bonnal et al. | |
| 2021/0199220 A1 | 7/2021 | Truong | |
| 2021/0310594 A1 | 10/2021 | Ramaswamy | |
| 2022/0252194 A1* | 8/2022 | Benson ................... | F16L 37/30 |
| 2023/0122306 A1 | 4/2023 | Benson et al. | |
| 2023/0375116 A1* | 11/2023 | Stangl .................. | A61M 39/18 |

OTHER PUBLICATIONS

International Search Report and Written Opinion in International Appln. No. PCT/US2024/046626, mailed on Dec. 5, 2024, 7 pages.

* cited by examiner

*Primary Examiner* — Kelsey E Cary

(74) *Attorney, Agent, or Firm* — Fish & Richardson P.C.

(57) ABSTRACT

Some fluid couplings, as described in this document, have an actuatable valve. In some examples, the actuatable valves provide an unobstructed flow path when switched to the "open" position and a closed flow path when switched to the "closed" position.

21 Claims, 13 Drawing Sheets

200"

200'''

200""

233
232'

200"""

FLUID COUPLINGS WITH AN IN-LINE FLOW VALVE

CROSS-REFERENCE TO RELATED APPLICATIONS

This application claims the benefit of U.S. Provisional Application Ser. No. 63/538,726 filed Sep. 15, 2023. The disclosure of the prior application is considered part of (and is incorporated by reference in) the disclosure of this application.

BACKGROUND

1. Technical Field

This document relates to fluid couplings with an actuatable valve that provides an unobstructed flow path when configured in the "open" position and that closes the flow path when reconfigured to the "closed" position.

2. Background Information

In typical aseptic connectors, due to the requirements of radiation and/or autoclave sterilizations methods, the use of metals is prohibited and only a limited range of polymer materials (both thermoplastic and thermoset) can be used. Therefore, the use of ball valves and other "full flow path" designs that require metals or soft polymers are impractical or impossible. As a result, the industry has typically utilized O-ring seals as the seal of choice, and therefore required a component that resided at the center of the flow path to house the seal. This arrangement impedes flow and limits the ability to maximize fluid transfer rate. The fluid couplings disclosed herein resolve these limitations while maintaining the practicality and cost efficiency of a polymer-based fluid connector valve.

SUMMARY

This document describes fluid couplings with an actuatable valve that provides an unobstructed flow path when configured to the "open" position and that closes the flow path when reconfigured to the "closed" position.

In one aspect, this disclosure is directed to a selectively actuatable shut-off valve, or fluid coupling, that includes a body termination comprising a first fluid connection end and defining a longitudinal axis and an open internal space; a cartridge fixedly coupled to the body termination within the open internal space; a collar rotatably coupled to an outer diameter of the body termination, the collar comprising one or more protrusions; an insert termination comprising a valve member and a second fluid connection end, the insert termination defining one or more grooves extending around and along the longitudinal axis, wherein each protrusion of the one or more protrusions is slidably coupled within one groove of the one or more grooves; and a flexible bellow located within the open internal space and comprising: (i) a first end attached to the cartridge and (ii) a second end attached to the insert termination, wherein the second end of the bellow is radially spaced apart from an inner wall surface of the body termination.

Such a shut-off valve, or fluid coupling, may optionally include one or more of the following features. The one or more grooves may helically extend around and along the longitudinal axis. The may be reconfigurable between: (i) an open configuration in which a fluid flow path is opened between the first fluid connection end and the second fluid connection end and (ii) a closed configuration in which the fluid flow path is blocked between the first fluid connection end and the second fluid connection end. The shut-off valve may be configured such that rotation of the collar relative to the body termination reconfigures the shut-off valve between the open configuration and the closed configuration. The shut-off valve may also include a latching mechanism that can be actuated to detain or release the shut-off valve in or from one or more of the open configuration and the closed configuration. In some embodiments, an end of the valve member protrudes beyond the first fluid connection when the shut-off valve is in the closed configuration. In select embodiments, an end of the valve member is recessed within the internal space in comparison to the first fluid connection when the shut-off valve is in the closed configuration. The shut-off valve may also include a tamper-evident member configured to make a previous rotation of the collar visually detectable. In some embodiments, the insert termination includes one or more radially extending projections, wherein the body termination includes one or more longitudinally extending grooves, and each radially extending projection of the one or more radially extending projections is slidably disposed within one longitudinally extending groove of the one or more longitudinally extending groove. The shut-off valve may also include a first seal member disposed in an annular groove defined between the body termination and the cartridge. The first seal member may seal against an outer diameter of the valve member when the shut-off valve is in the closed configuration. In some embodiments, the annular groove has a trapezoidal cross-sectional shape. The shut-off valve may also include a second seal member and a third seal member that are each disposed between the cartridge and the body termination. The shut-off valve may also include a fourth seal member disposed between the insert termination and the cartridge. In some cases, the first seal member and the second seal member are each positioned on shoulders of the cartridge. In particular cases, the second seal member and the third seal member are each positioned in an annular groove defined by the cartridge. The one or more grooves may be exactly two grooves and the one or more protrusions may be exactly two protrusions. The one or more grooves may be exactly three grooves and the one or more protrusions may be exactly three protrusions. The one or more grooves may be exactly four grooves and the one or more protrusions may be exactly four protrusions. In some embodiments, the cartridge snaps into the fixedly coupled arrangement with the body termination.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION

This document describes fluid couplings with an actuatable valve that provides an unobstructed flow path when configured to the "open" position and that closes the flow path when reconfigured to the "closed" position.

Figure 1:
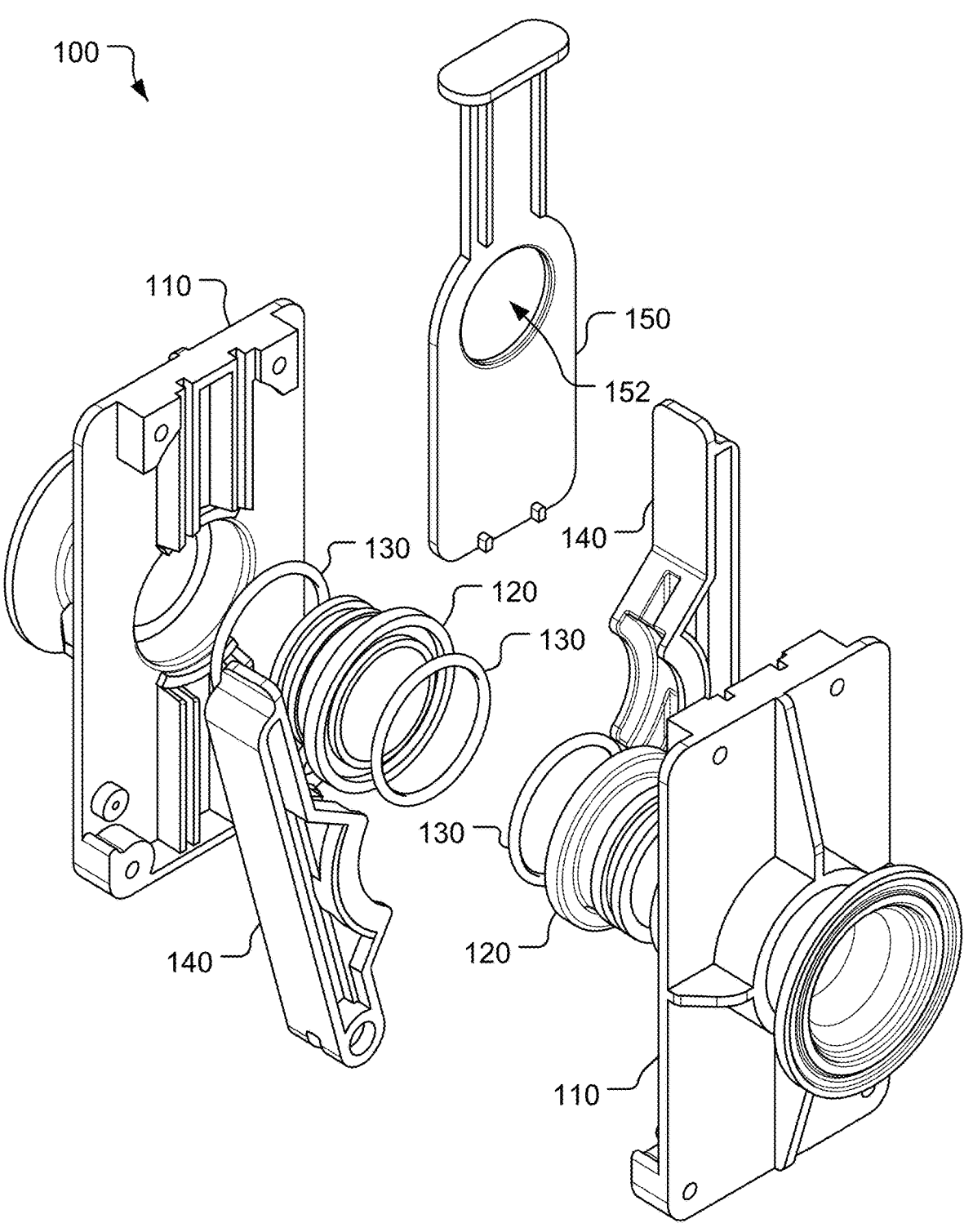
FIGS. 1-10 illustrate various views of a first example fluid coupling with an in-line valve in accordance with some embodiments.

Referring to the exploded view of FIG. 1, the fluid coupling 100 includes a housing 110 (comprised of two halves), two inner sleeves 120, four annular seals 130, two pusher brackets 140, and a valve plate 150.

Figure 10:
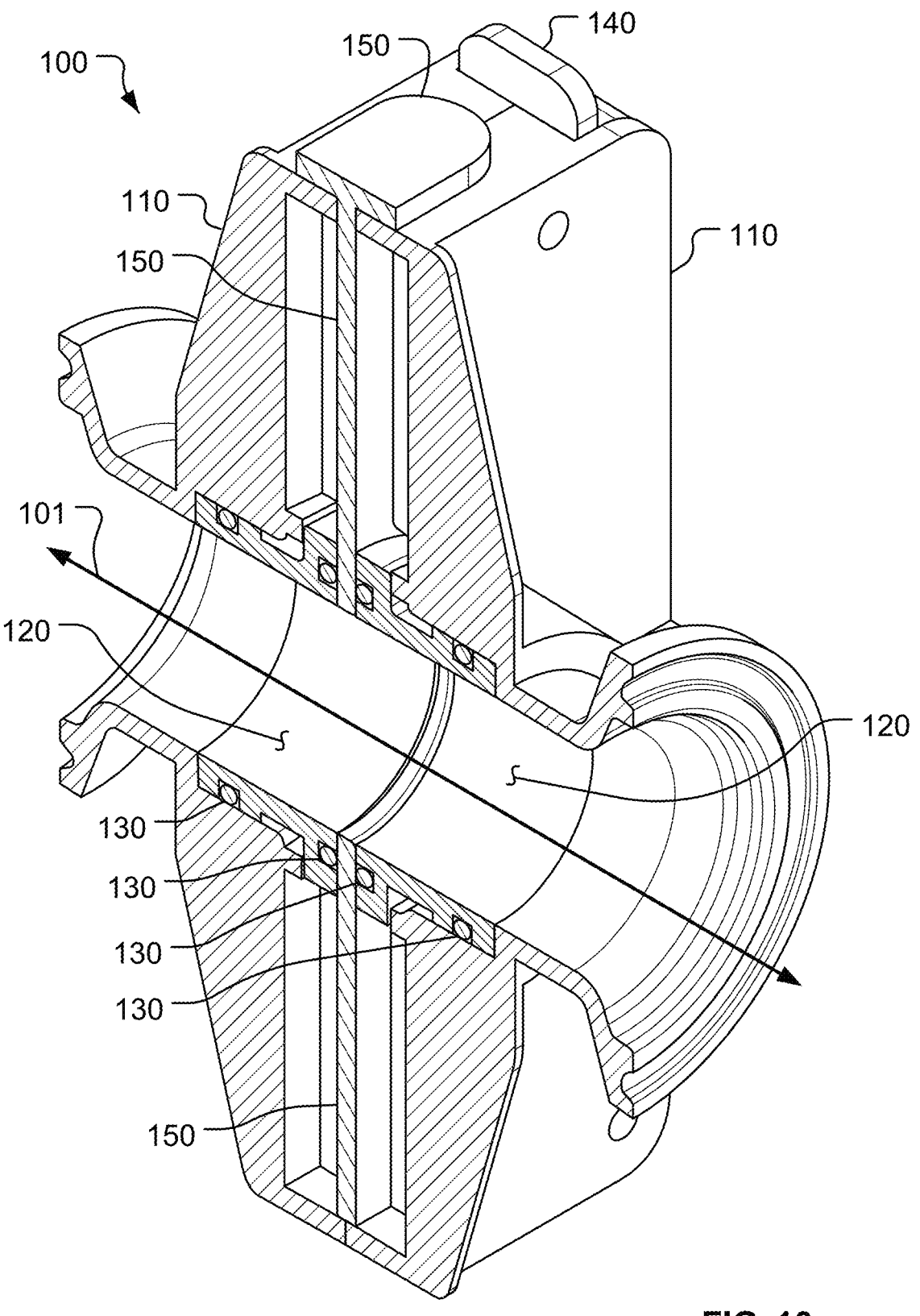

Referring also to the longitudinal cross-sectional view of FIG. 10, the two halves of the housing 110 are attached together and are immovable in relation to each other. Each of the two inner sleeves 120 is coupled with a corresponding half of the housing 110. The inner sleeves 120 are free to translate a small distance along the axis 101 in relation to the halves of the housing 110. The annular seals 130 seal between: (i) each inner sleeve 120 and its corresponding half of the housing 110, and (ii) each inner sleeve 120 and the valve plate 150. The two pusher brackets 140 are pivotably coupled to the housing 110. The pusher brackets 140 releasably engage with the inner sleeves 120 when the pusher brackets 140 are pivoted inward against the housing 110 (e.g., as shown in FIG. 10). The valve plate 150 is slidably coupled to the housing 110 and is manually movable, transversely relative to the axis 101 between a fluid flow path open position (as in FIG. 10) and a fluid flow path closed position.

The two halves of the housing 110 include fluid component connections (which are sanitary fittings in this example). Any type of connection(s) can be included for the two halves of the housing 110 (and for any other fluid couplings described herein) such as, but not limited to, a compression fitting, a sanitary fitting, a press-in fitting, a luer fitting, a straight threaded fitting or a pipe threaded fitting (internal or external), a pigtail, a T-fitting, a Y-fitting, and any other suitable type of configuration such that the fluid coupling 100 is configured for connection to a fluid system as desired. Each half of the housing 110 may have the same type of connection, or the two halves of the housing 110 may have differing types of connections. In some embodiments, the fluid coupling 100 may be supplied with removable caps (not shown), or another type of component, that is releasably coupled with the fluid component connections.

The materials from which one or more of the components of the fluid coupling 100 (and any other fluid couplings described herein) are made of include thermoplastics. In particular embodiments, the materials from which the components of the fluid coupling 100 are made of are thermoplastics, such as, but not limited to, acetal, polycarbonate, polysulfone, polyether ether ketone, polysulphide, polyester, polyvinylidene fluoride (PVDF), polyethylene, polyphenylsulfone (PPSU; e.g., Radel®), polyetherimide (PEI; e.g., Ultem®), polypropylene, polyphenylene, polyaryletherketone, and the like, and combinations thereof. In some embodiments, the materials from which one or more of the components of the fluid coupling 100 are made of include metals such as, but not limited to stainless steel, brass, aluminum, plated steel, and the like.

In particular embodiments, the fluid coupling 100 (and any other fluid couplings described herein) is/are metallic-free. In some embodiments the fluid coupling 100 includes one or more metallic spring members (e.g., spring steel, stainless steel, and the like) or plastic spring members.

In certain embodiments, the annular seals 130 (and the seals of any other fluid couplings described herein) are made of materials such as, but not limited to, silicone, fluoroelastomers (FKM), ethylene propylene diene monomer (EPDM), perfluoroelastomers (e.g., FFKM, Kalrez®, Chemraz® and the like), thermoplastic elastomers (TPE), buna, buna-N, thermoplastic vulcanizates (TPV), and the like. The cross-sectional shape of the annular seals 130 can be an hourglass-shape, an oval shape, a circular shape, D-shaped, X-shaped, square, rectangular, U-shaped, L-shaped, V-shaped, a polygonal shape, a multi-lobe shape, or any other suitable shape, without limitation.

Figures 2, 3:
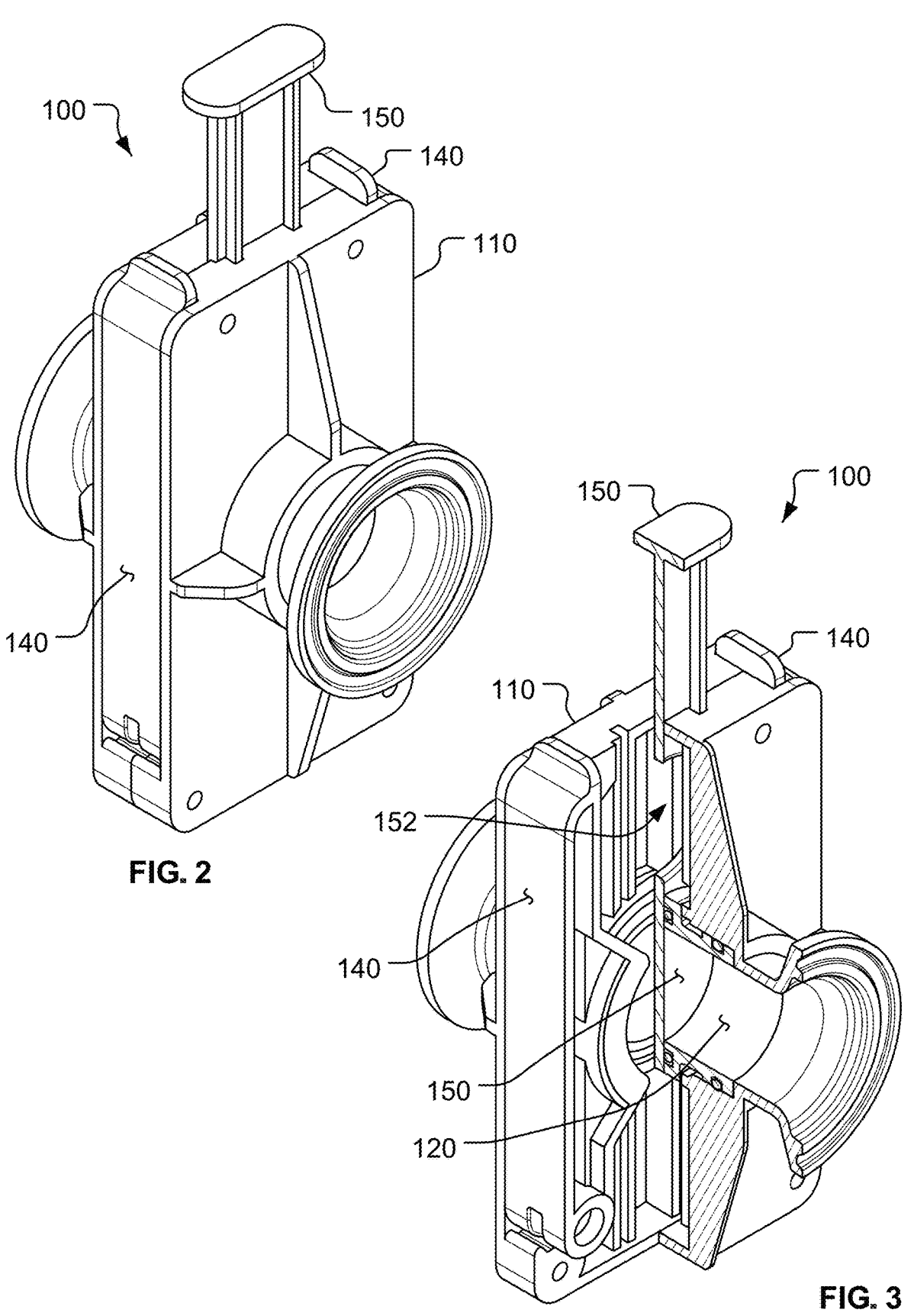
Figures 4, 5:
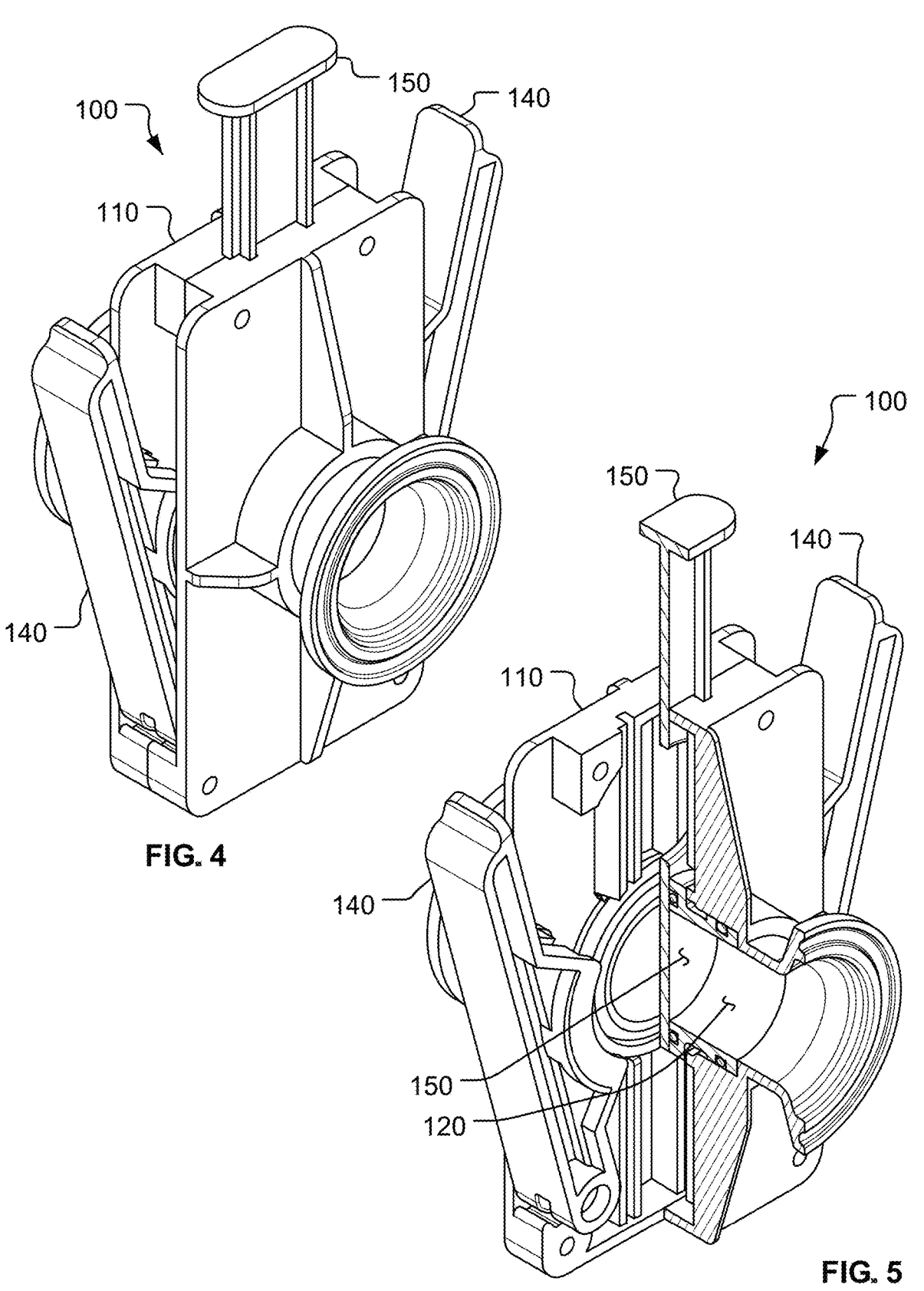
Figures 6, 7:
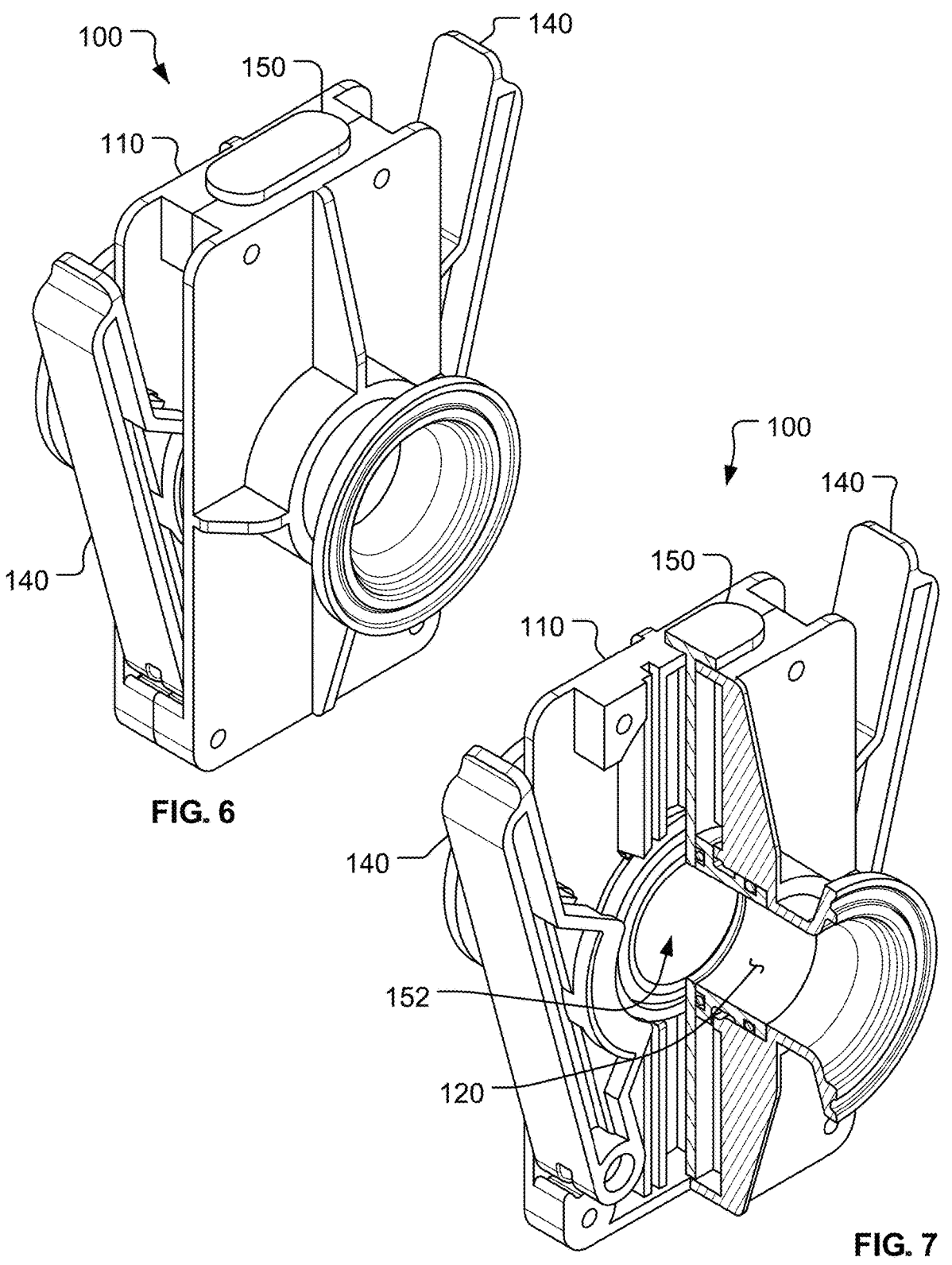
Figures 8, 9:
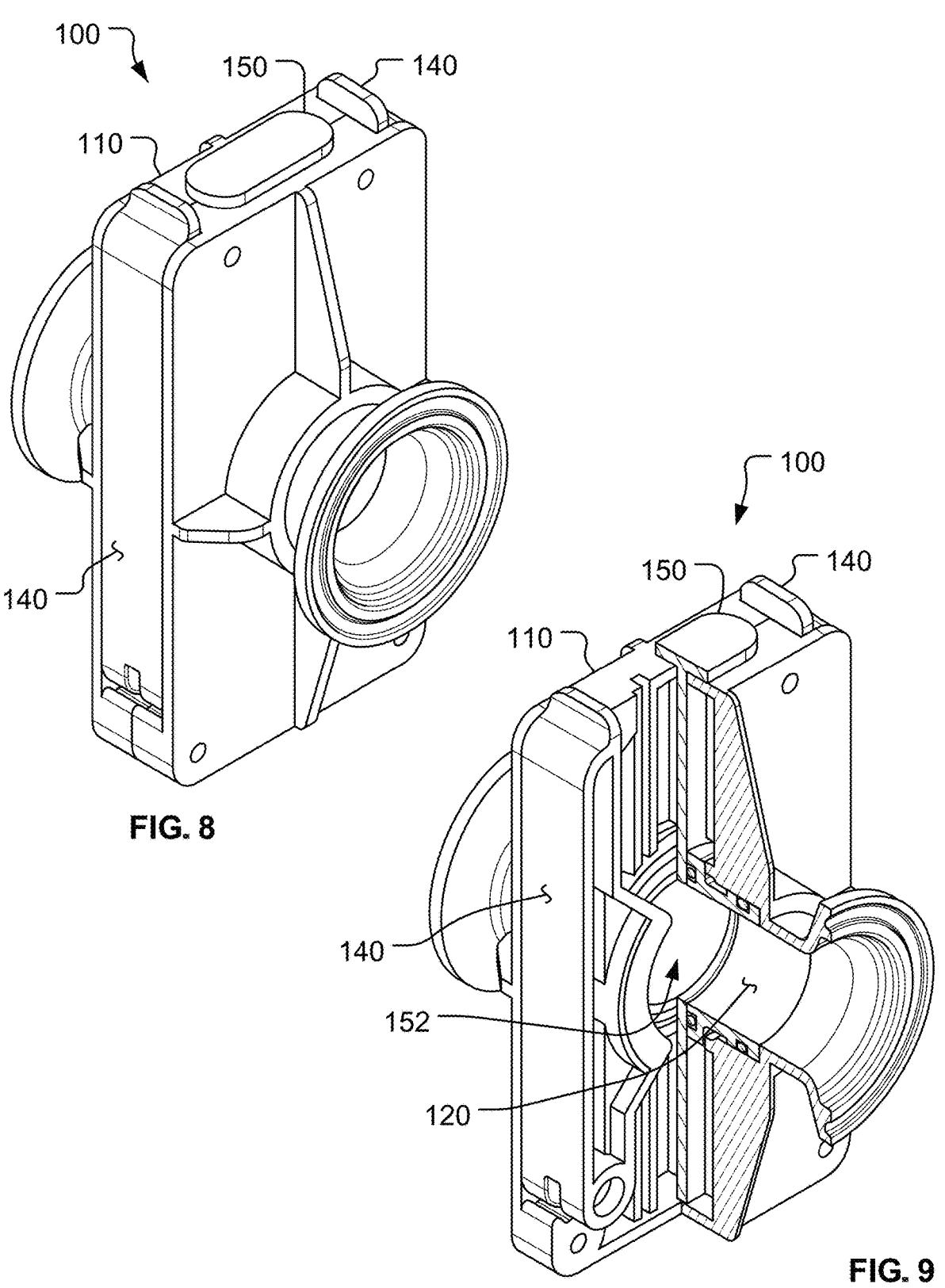

As shown in FIGS. 2-10, the fluid coupling can be configured in at least four different configurations or states: (i) closed-activated (FIGS. 2 and 3); (ii) closed-deactivated (FIGS. 4 and 5); (iii) open-deactivated (FIGS. 6 and 7); and (iv) open-activated (FIGS. 8-10).

In the closed state, no fluid can flow through the fluid coupling 100 because the valve plate 150 obstructs the fluid flow path. In the open state, fluid can flow through the fluid coupling because an opening 152 in the valve plate 150 is concentric with (or at least partially in alignment with) the longitudinal openings of the two halves of the housing 110 and each inner sleeve 120 to create an open fluid flow path through the fluid coupling 100.

In the activated state (i.e., when the pusher brackets 140 are pivoted against the housing 110 as shown in FIGS. 2, 3, and 8-10), the pusher brackets 140 engage with flanges of the inner sleeves 120 to compress the inner sleeves 120 longitudinally toward each other. That manner of compression exerted on the inner sleeves 120 by the pusher brackets 140 is similar to the type and manner of compression provided by a clamp that is used to couple two sanitary fittings to each other (e.g., with a gasket in between).

The valve plate 150 (or a portion thereof) is located between the inner sleeves 120. That is the case when the valve plate 150 is in the closed position, and even when the valve plate 150 is in the open position. Accordingly, in the activated state (i.e., when the pusher brackets 140 are pivoted against the housing 110 as shown in FIGS. 2, 3, and 8-10), the pusher brackets 140 longitudinally compress the valve plate 150 between the inner sleeves 120 (and between the seals 130 that are located on the front ends/faces of the inner sleeves 120). That compression causes at least two desired results.

First, the compression makes movement of the valve plate 150 relative to the housing 110 difficult or impossible. That is, the compression (i.e., when the pusher brackets 140 are pivoted against the housing 110) effectively locks the valve plate 150 relative to the housing 110. The valve plate 150 can thereby be locked in the open state, in the closed state, or in a partially open state.

Second, the compression results in leak-proof or leak-resistant functionality of the fluid coupling 100. When the pusher brackets 140 are in the activated state, the pusher brackets 140 longitudinally compress the seals 130 (located on the front ends/faces of the inner sleeves 120) between the inner sleeves 120 and the valve plate 150. In this compressed condition, the seals 130 functionally prevent fluid leaks. That is the case whether the valve plate is in the open state or in the closed state.

In the deactivated state (i.e., when the pusher brackets 140 are pivoted away from the housing 110 as shown in FIGS. 4-7), there is no longitudinal compression exerted by the pusher brackets 140 on the inner sleeves 120. Accordingly, the valve plate 150 can be manually moved in relation to the housing 110 (e.g., between open and closed). Also, fluid leaks may be more likely to occur (e.g., especially if fluid inside of the fluid coupling 100 is pressurized).

When the valve plate 150 is in the open position (e.g., see FIG. 10), the fluid flow path is fully unobstructed to thereby minimize fluid friction/resistance and to thereby maximize the fluid flow rate.

Figures 11, 12, 13:
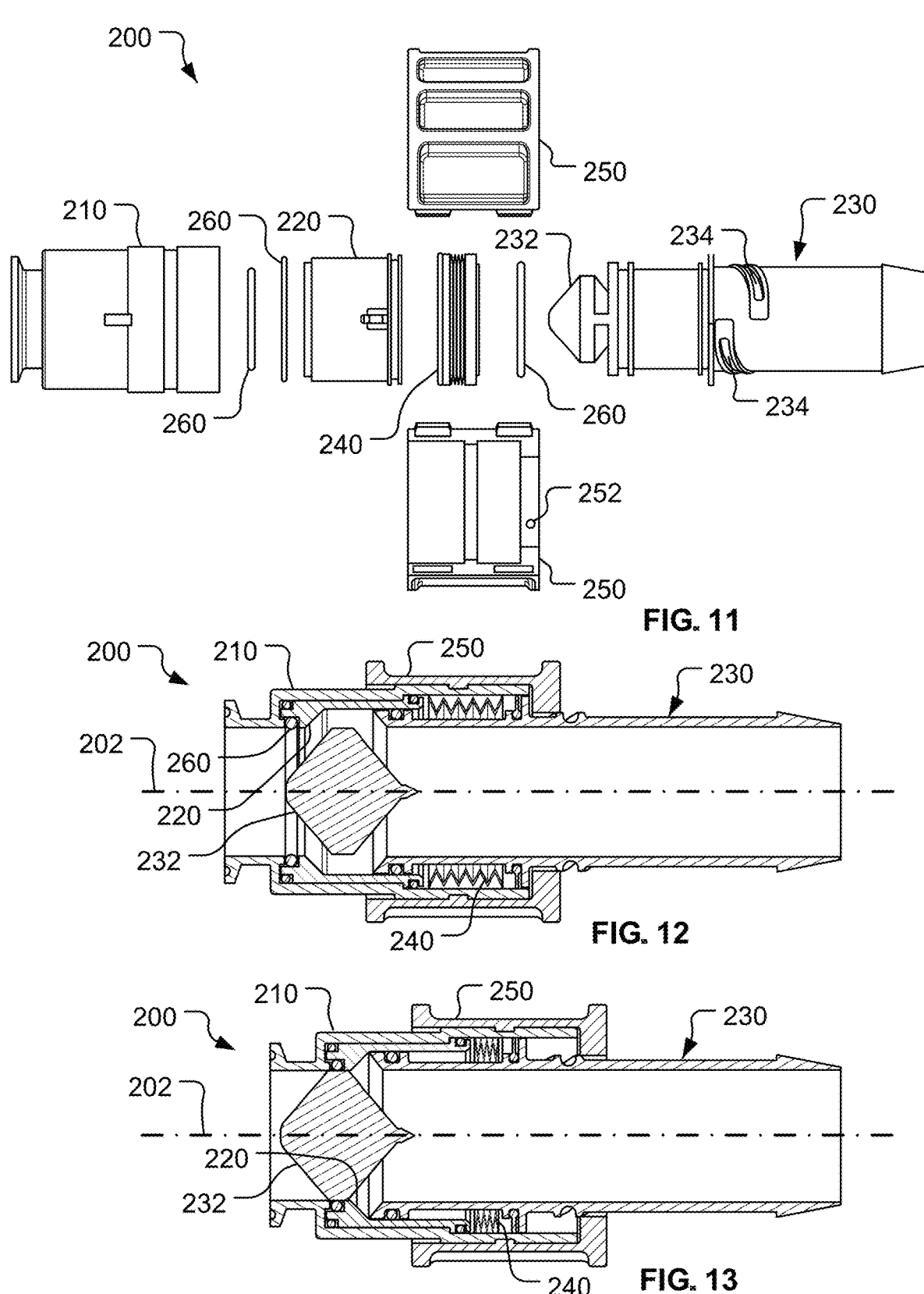
FIGS. 11-26 illustrate various views of multiple variations of a second example fluid coupling with an in-line valve in accordance with some embodiments.

FIG. 11 illustrates an exploded view of another example fluid coupling 200 that includes a manually actuatable valve. The fluid coupling 200 includes a body termination 210, a cartridge 220, an insert termination 230 (with a valve member 232 and grooves 234), a flexible bellow 240, a collar 250, and seals 260.

In the assembled arrangement (e.g., as shown in FIGS. 12 and 13) the cartridge 220 is fixedly coupled to the body termination 210. The collar 250 is rotatably coupled to the body termination 210. The insert termination 230 is longitudinally translatable (but not rotatable) relative to the body termination 210 and to the cartridge 220. The insert termination 230 is longitudinally keyed to the body termination 210 (by one or more projections that are slidably engaged within one or more longitudinally extending grooves) so that rotations therebetween are prevented. The collar 250 includes one or more projections 252 that slidably reside in one or more grooves 234 defined by the insert termination 230. The bellow 240 has a first end that is attached to the cartridge 220 and a second end that is attached to the insert termination 230. The second end of the bellow 240 is spaced apart from, and thereby not in contact with, the inner wall surface of the body termination 210.

The one or more grooves 234 of the insert termination 230 extend(s) around and along a longitudinal axis 202 of the fluid coupling 200. In some cases, the one or more grooves 234 of the insert termination 230 extend(s) helically around and along a longitudinal axis 202 of the fluid coupling 200.

The one or more projections 252 slidably reside in one or more grooves 234 defined by the insert termination 230. Accordingly, as a user manually rotates the collar 250 relative to the body termination 210 and insert termination 230, the insert termination 230 is longitudinally driven toward or away from the body termination 210.

The overall longitudinal length of the fluid coupling 200 is increased or decreased as the user manually rotates the collar 250 relative to the body termination 210 and insert termination 230. This can be visualized by comparing the lengths of the fluid coupling 200 in FIGS. 12 and 13 (i.e., the fluid coupling 200 is shorter in the arrangement depicted in FIG. 13).

The valve member 232 (which is located on the end of the insert termination 230) is also longitudinally driven toward or away from the body termination 210 as a user manually rotates the collar 250 relative to the body termination 210 and insert termination 230. The valve member 232 can thereby be moved from an open configuration (FIG. 12) to a closed configuration (FIG. 13).

In the closed configuration (FIG. 13), the valve member 232 is seated/sealed against a seal 260 that is positioned in a groove defined between the body termination 210 and the cartridge 220. In that closed configuration, no fluid can flow through the fluid coupling 200.

In the open configuration (e.g., FIG. 12), the valve member 232 is spaced apart from the seal 260 that is positioned in a groove defined between the body termination 210 and the cartridge 220. In that open configuration, fluid can flow through the fluid coupling 200. Accordingly, a user can open and close the fluid flow path through the fluid coupling 200 by rotating the collar 250 relative to the body termination 210 and insert termination 230 so that the valve member 232 moves between the seated position (FIG. 13) and the unseated position (FIG. 12). Moreover, the flow of fluid can be restricted or regulated when the valve member 232 is positioned in various interim locations between the fully closed and fully opened configurations.

Figures 16, 17, 18:
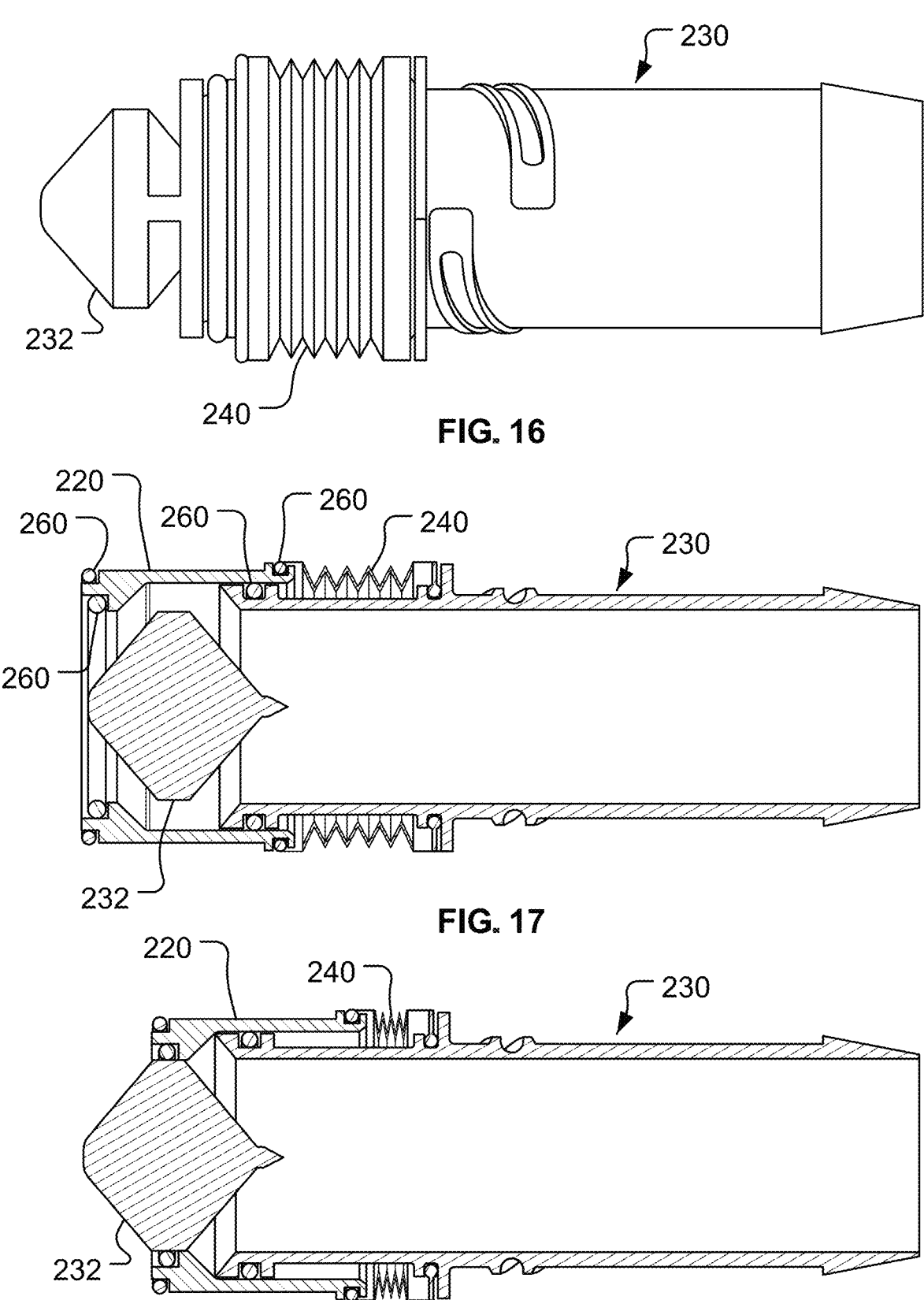

As also shown in FIGS. 16-18, the length of the bellow 240 extends or retracts as the user rotates the collar 250 relative to the body termination 210 and insert termination 230 to move the valve member 232 between its closed configuration (FIG. 18) and its open configuration (FIG. 17). That is because the bellow 240 has a first end that is attached to the cartridge 220 and a second end that is attached to the insert termination 230. The bellow 240 acts as a contaminant barrier (preventing dust or contaminants from entering the internal areas of the fluid coupling 200.

OPTIONAL FEATURES AND/OR OTHER EMBODIMENTS

Figure 19:
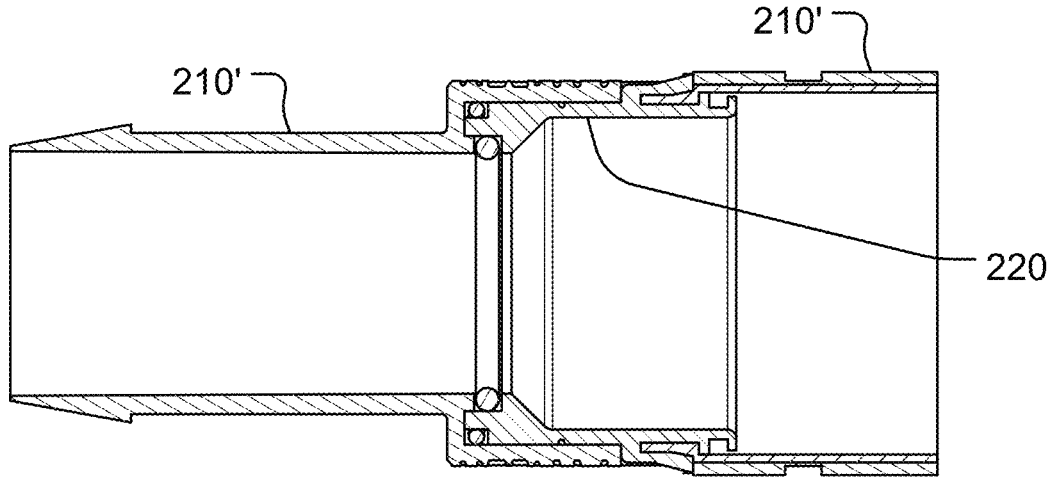
Figure 20:
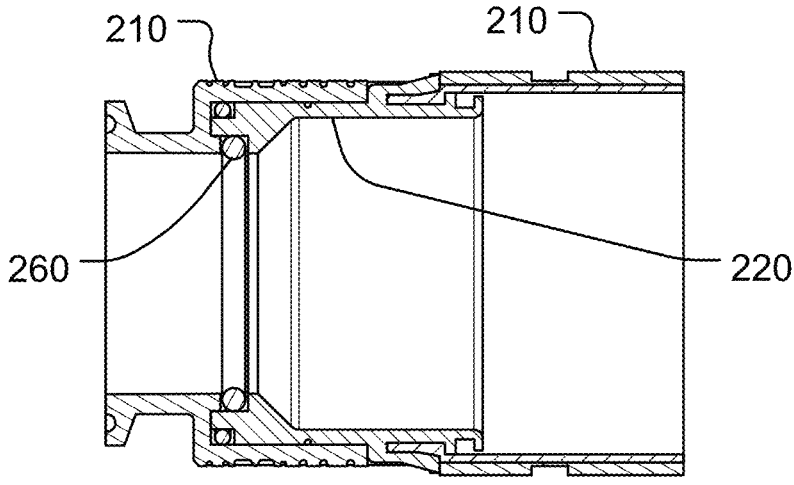

As best seen in FIGS. 19 and 20, in some embodiments the cartridge 220 snaps into the body termination 210 to couple the two components together in a fixed arrangement. Alternatively, the cartridge 220 can be attached to the body termination 210 by other means including, but not limited to, ultrasonic or laser welding, using adhesive, a friction fit, or by being molded as a one-piece assembly.

Figure 21:
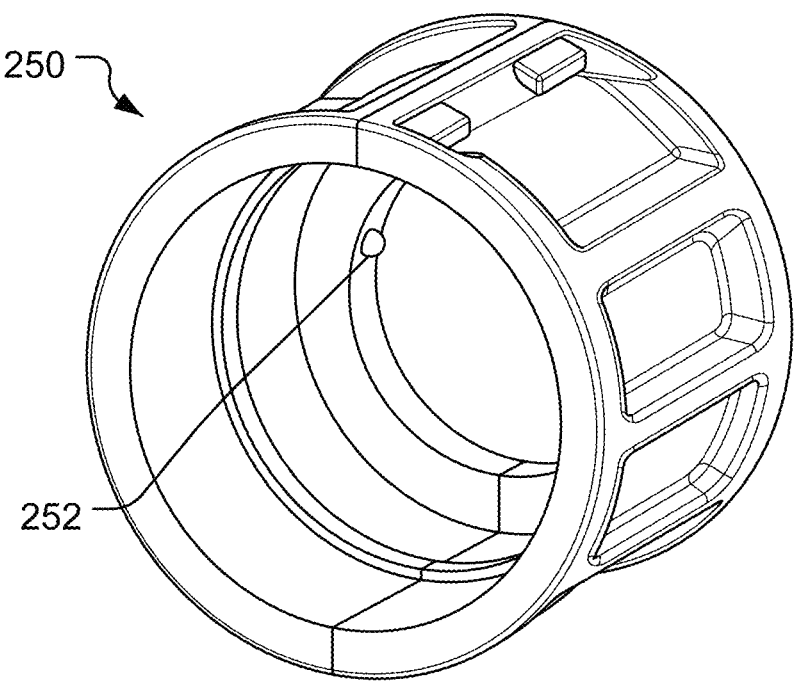
Figure 22:
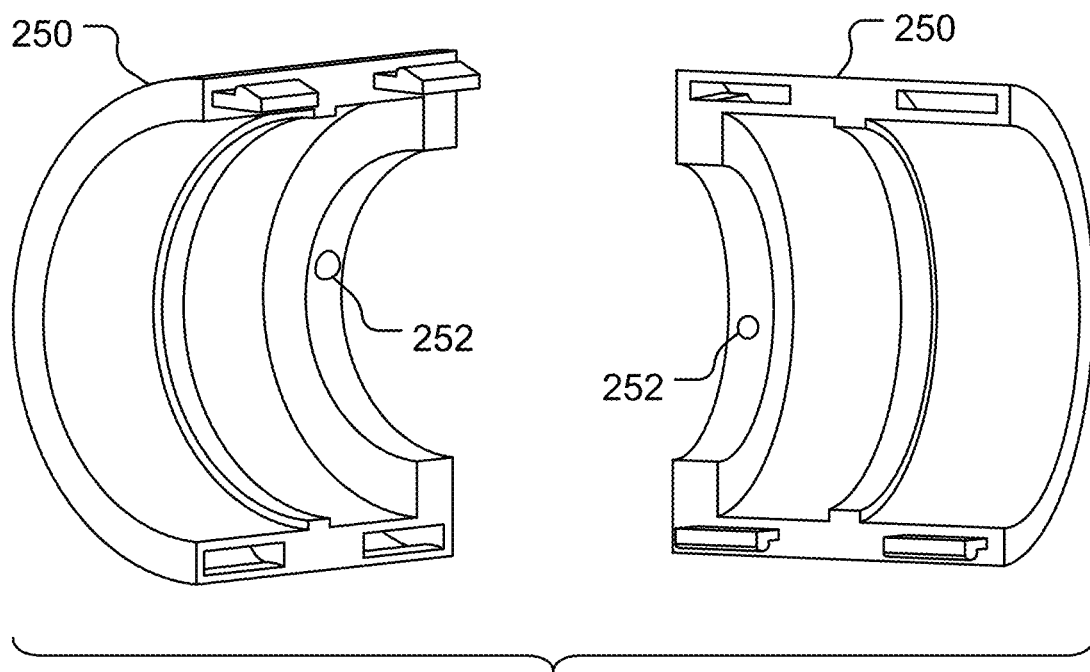

As shown in FIGS. 11, 21, and 22, in the depicted embodiment the collar 250 is manufactured in two identical halves. The halves of the collar 250 are joined by barbed cantilever latches that extend into/through corresponding slots/openings. Alternatively, the collar 250 can be made by other means including, but not limited to, ultrasonic or laser welding, using adhesive, a friction fit, or by being molded as a one-piece assembly.

Figure 14:
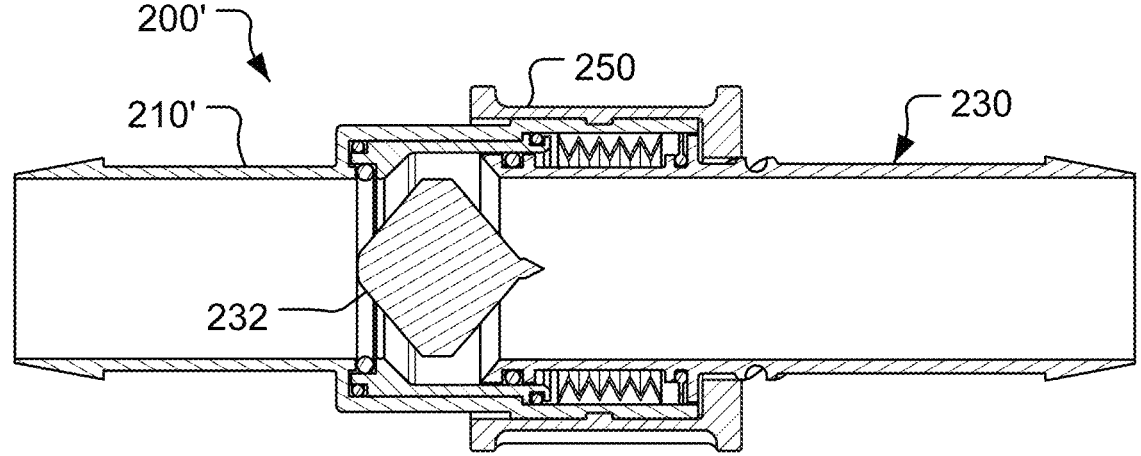
Figure 15:
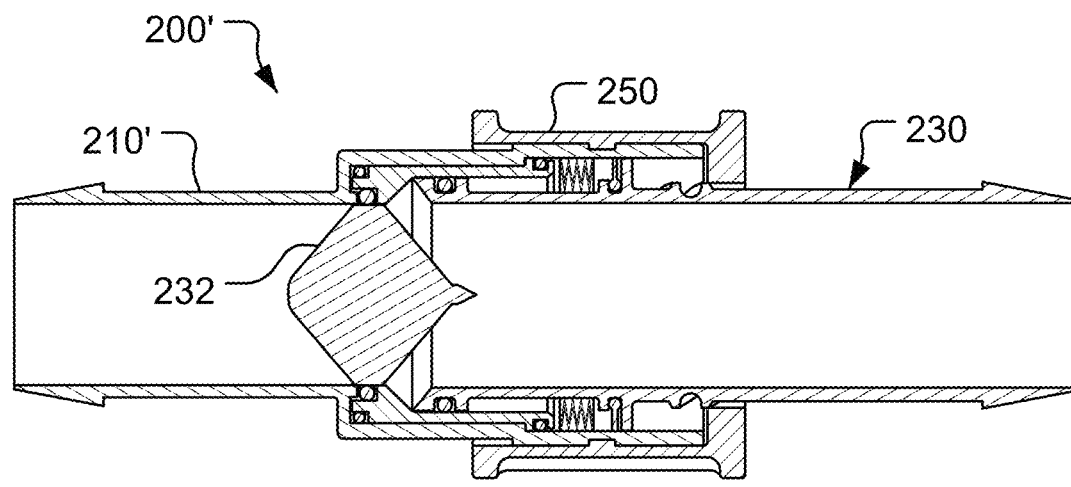

As shown in FIGS. 14 and 15, the body termination can have various configurations such as the body termination 210'. In comparison to the body termination 210, the body termination 210' is a barbed fitting (not a sanitary fitting) and is longer than the body termination 210.

In some embodiments, the fluid coupling 200 includes a manually actuatable latching mechanism that can be actuated to detain and/or release the shut-off valve 232 in one or more of the open configuration and/or the closed configuration. In other words, the latching mechanism can be included so that a user must first actuate the latching mechanism in order to be able to rotate the collar 250 (to move the valve member 232). The latching mechanism can be a pivotable member, a depressible spring-loaded member, and so on.

In some embodiments, the fluid coupling 200 includes a tamper-evident member that can visually indicate whether the collar 250 has been rotated. Such a tamper-evident element can be designed such as, but not limited to, a tearaway sleeve, shrink wrap, an adhesive sealing member (e.g., tape), and the like.

In the depicted embodiments, the seal groove defined between the body termination 210 and the cartridge 220 (in which the seal 260 that the valve member 232 seals against in the closed configuration) has a square or rectangular cross-section. Alternatively, the seal groove can have a trapezoidal cross-sectional shape. The radially inward facing side of the trapezoid (i.e., the open side where the seal 260 is exposed to seat against the valve member 232) can be shorter in length than the opposite side (the base) of the trapezoidal cross-sectional shape.

Whereas in the depicted embodiments, some of the seals 260 are seated on shoulders of the cartridge 220, in some embodiments one or more of the shoulders are replacement be an annular groove(s) defined by the cartridge 220. The seal(s) 260 can be seated in such annular groove(s) defined by the cartridge 220.

In the depicted embodiments, the one or more projections 252 are hemispherical and the one or more grooves 234 have a corresponding semi-circular shape. Alternatively, the one or more projections 252 can be segments of a screw thread (e.g., jack screw thread or other type of thread) and the one or more grooves 234 can have a corresponding shape.

In the depicted embodiment, the collar 250 has two projections 252 and the insert termination has two corresponding grooves 234. Alternatively, in some embodiments the collar 250 has one, three, or four projections 252 and the insert termination has one, three, or four grooves 234.

Figure 23:
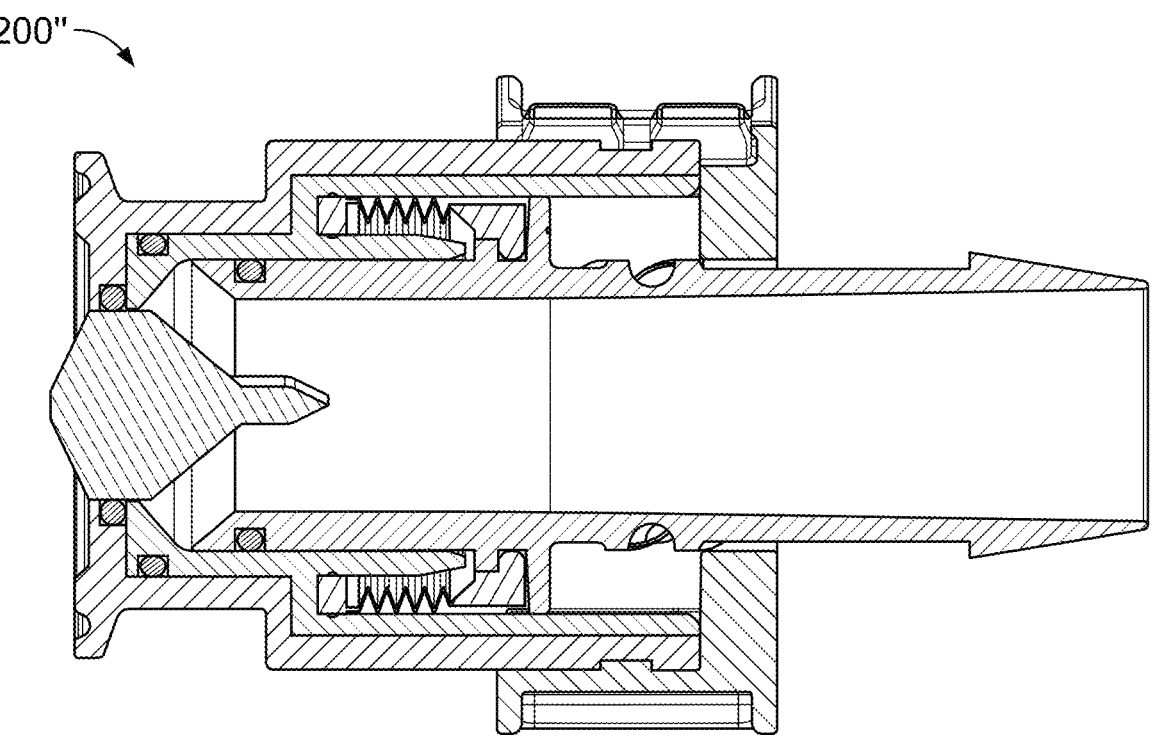
Figure 24:
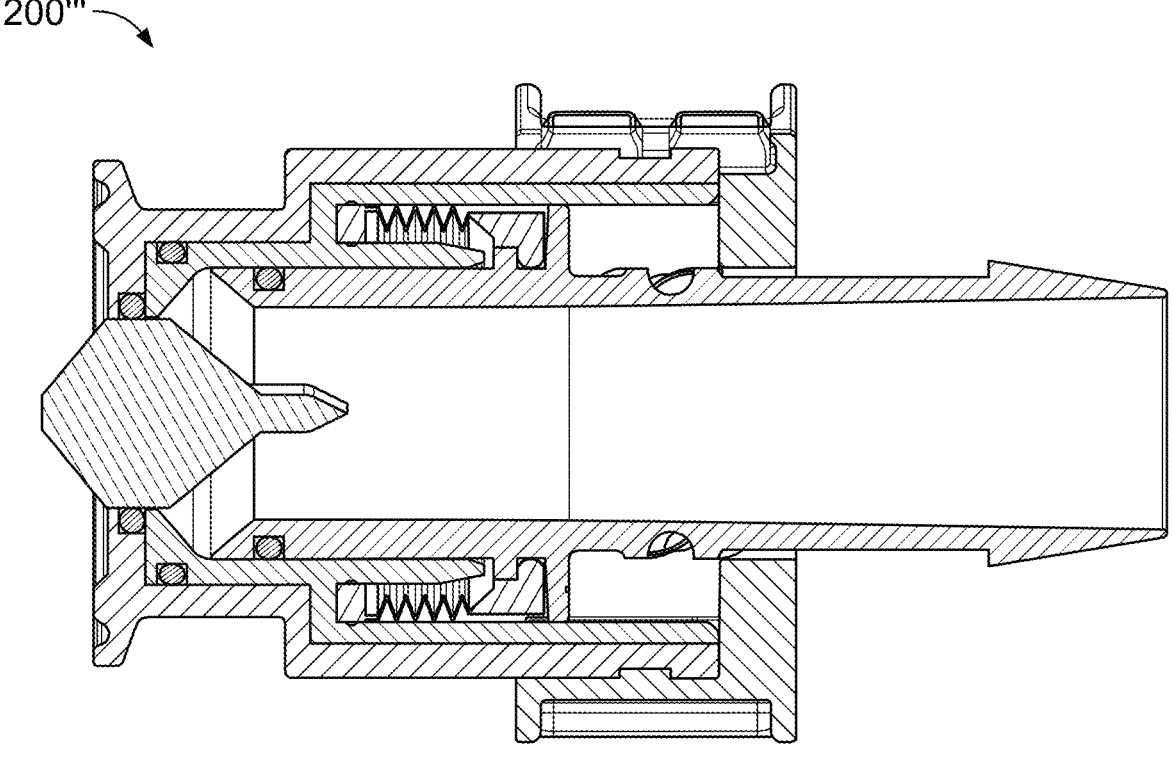

In FIGS. 13 and 15, the longitudinal position of the end of the valve member 232 is recessed from the longitudinal position of the end of the end of the body termination 210 when the valve member 232 is in its closed position. Alternatively, in the configurations shown in FIGS. 23-25 the opposite is true. That is, in FIGS. 23—the longitudinal position of the end of the valve member 232 projects farther out (protrudes beyond) in comparison to the longitudinal position of the end of the end of the body termination 210 when the valve member 232 is in its closed position. In every configuration, the longitudinal position of the end of the valve member 232 is not equal to, and is not flush with, the longitudinal position of the end of the end of the body termination 210 when the valve member 232 is in its closed position.

Figure 25:
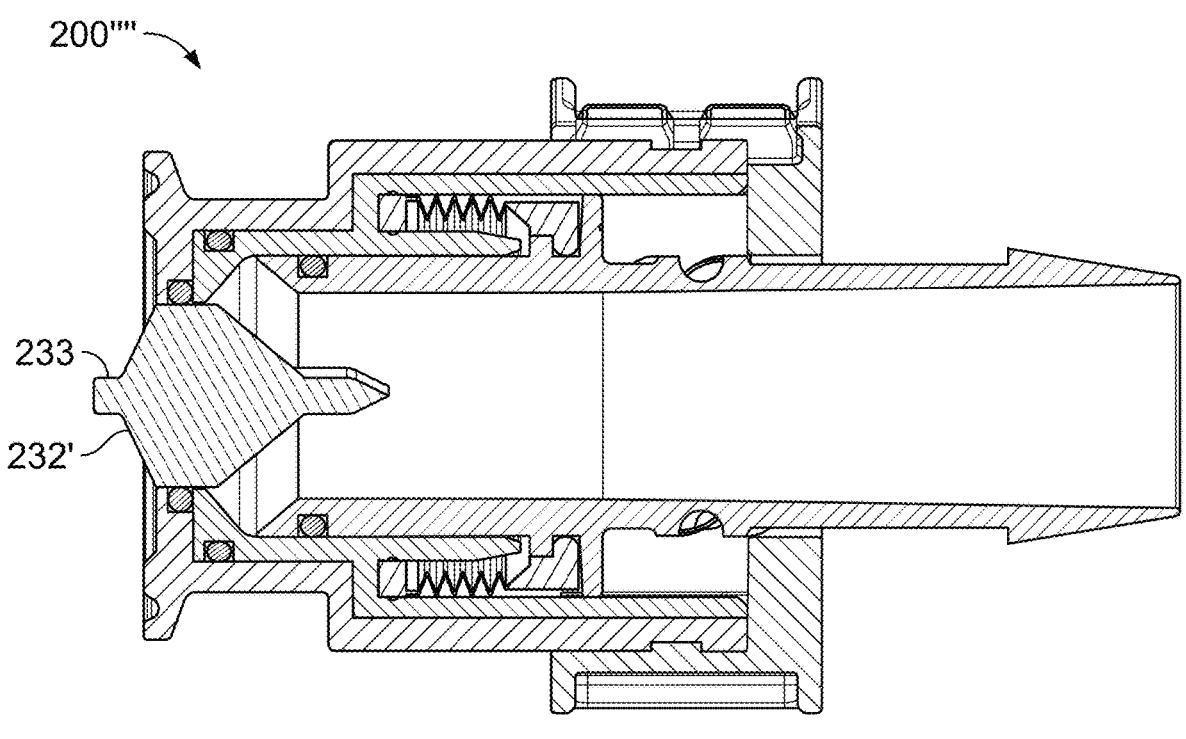
Figure 25:
Figure 26:
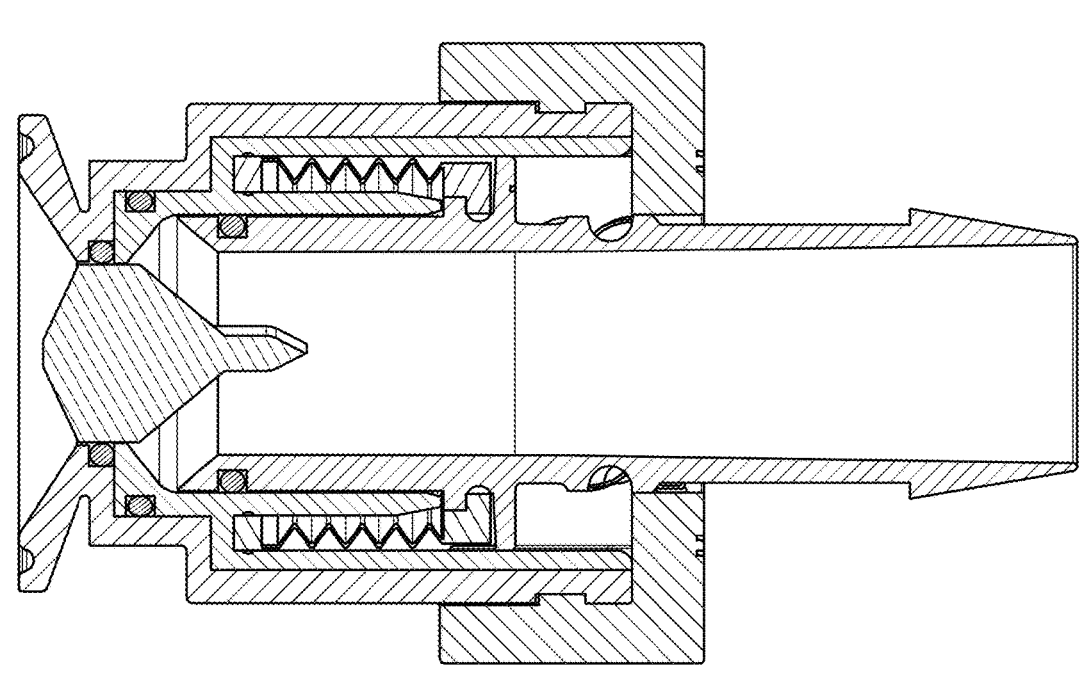

The valve member 232' shown in FIG. 25 includes a flow leader 233 that longitudinally projects farther out in comparison to the longitudinal position of the end of the end of the body termination 210. The flow leader 233 can enhance fluid flow characteristics in some cases.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A selectively actuatable shut-off valve comprising:
   a body termination comprising a first fluid connection end and defining a longitudinal axis and an open internal space;
   a cartridge fixedly coupled to the body termination within the open internal space;
   a collar rotatably coupled to an outer diameter of the body termination, the collar comprising one or more protrusions;
   an insert termination comprising a valve member and a second fluid connection end, the insert termination defining one or more grooves extending around and along the longitudinal axis, wherein each protrusion of the one or more protrusions is slidably coupled within one groove of the one or more grooves; and
   a flexible bellow located within the open internal space and comprising: (i) a first end attached to the cartridge and (ii) a second end attached to the insert termination, wherein the second end of the bellow is radially spaced apart from an inner wall surface of the body termination.

2. The shut-off valve of claim 1, wherein the one or more grooves helically extend around and along the longitudinal axis.

3. The shut-off valve of claim 1, wherein the shut-off valve is reconfigurable between: (i) an open configuration in which a fluid flow path is opened between the first fluid connection end and the second fluid connection end and (ii) a closed configuration in which the fluid flow path is blocked between the first fluid connection end and the second fluid connection end.

4. The shut-off valve of claim 3, wherein the shut-off valve is configured such that rotation of the collar relative to the body termination reconfigures the shut-off valve between the open configuration and the closed configuration.

5. The shut-off valve of claim 3, further comprising a latching mechanism that can be actuated to detain or release the shut-off valve in or from one or more of the open configuration and the closed configuration.

6. The shut-off valve of claim 3, wherein an end of the valve member protrudes beyond the first fluid connection when the shut-off valve is in the closed configuration.

7. The shut-off valve of claim 3, wherein an entirety of the valve member is within the internal space when the shut-off valve is in the closed configuration.

8. The shut-off valve of claim 1, further comprising a tamper-evident member configured to make a previous rotation of the collar visually detectable.

9. The shut-off valve of claim 1, further comprising a first seal member disposed in a first annular groove defined by the cartridge and the body termination, wherein the first seal member seals against an outer diameter of the valve member when the shut-off valve is in the closed configuration.

10. The shut-off valve of claim 9, wherein the first annular groove has a trapezoidal cross-sectional shape.

11. The shut-off valve of claim 9, further comprising a second seal member and a third seal member that are each disposed between the cartridge and the body termination.

12. The shut-off valve of claim 11, further comprising a fourth seal member disposed between the insert termination and the cartridge.

13. The shut-off valve of claim 11, wherein the third seal member is positioned in a second annular groove defined by the cartridge and the body termination.

14. The shut-off valve of claim 1, further comprising a first seal member and a second seal member, wherein the first seal member and the second seal member are each positioned on shoulders of the cartridge.

15. The shut-off valve of claim 1, wherein the one or more grooves includes exactly two grooves and the one or more protrusions includes exactly two protrusions.

16. The shut-off valve of claim 1, wherein the one or more grooves includes exactly three grooves and the one or more protrusions includes exactly three protrusions.

17. The shut-off valve of claim 1, wherein the one or more grooves includes exactly four grooves and the one or more protrusions includes exactly four protrusions.

18. The shut-off valve of claim 1, wherein the cartridge snaps into the fixedly coupled arrangement with the body termination.

19. A selectively actuatable shut-off valve comprising:

a body termination comprising a first fluid connection end and defining a longitudinal axis and an open internal space;

a cartridge coupled to the body termination within the open internal space;

a collar coupled to an outer diameter of the body termination;

an insert termination comprising a valve member and a second fluid connection end; and a bellow located within the open internal space and comprising: (i) a first end attached to the cartridge and (ii) a second end attached to the insert termination, wherein the second end of the bellow is radially spaced apart from an inner wall surface of the body termination.

20. The shut-off valve of claim 19, wherein the bellow is configured to be flexible.

21. A selectively actuatable shut-off valve comprising:

a body termination comprising a first fluid connection end and defining a longitudinal axis and an open internal space;

a cartridge coupled to the body termination within the open internal space;

a collar coupled to an outer diameter of the body termination;

an insert termination comprising a valve member and a second fluid connection end; and a flexible bellow located within the open internal space and comprising: (i) a first end attached to the cartridge and (ii) a second end attached to the insert termination.

* * * * *